United States Patent
Yu et al.

(10) Patent No.: US 8,406,101 B2
(45) Date of Patent: Mar. 26, 2013

(54) OPTICAL DISK DRIVE AND METHOD FOR DRIVING A FEEDING DEVICE OF AN OPTICAL DISK DRIVE

(75) Inventors: Chih-Ching Yu, Hsinchu (TW); Ying-Feng Huang, Chia-Yi Hsien (TW); Yu-Chun Lin, Hsin-Chu (TW)

(73) Assignee: Mediatek Inc., Hsin-Chu (TW)

( * ) Notice: Subject to any disclaimer, the term of this patent is extended or adjusted under 35 U.S.C. 154(b) by 749 days.

(21) Appl. No.: 12/275,370

(22) Filed: Nov. 21, 2008

(65) Prior Publication Data

US 2010/0128581 A1   May 27, 2010

(51) Int. Cl.
*G11B 7/00* (2006.01)
(52) U.S. Cl. .................................... 369/44.32
(58) Field of Classification Search .............. None
See application file for complete search history.

(56) References Cited

U.S. PATENT DOCUMENTS

| | | | |
|---|---|---|---|
| 2005/0180276 A1* | 8/2005 | Watanabe et al. | 369/44.29 |
| 2007/0121467 A1* | 5/2007 | Itoga et al. | 369/100 |
| 2007/0206460 A1* | 9/2007 | Ono et al. | 369/44.32 |

FOREIGN PATENT DOCUMENTS

| | | |
|---|---|---|
| JP | 8336297 | 12/1996 |
| JP | 2002-218795 | 8/2002 |
| JP | 2005-078735 | 3/2005 |
| JP | 2006-158019 | 6/2006 |

OTHER PUBLICATIONS

English language translation of abstract of JP 2002-218795 (published Aug. 2, 2002).
English language translation of abstract of JP 2005-078735 (published Mar. 24, 2005).
English language translation of abstract of JP 2006-158019 (published Jun. 16, 2006).
English language translation of abstract of JP 8336297 (published Dec. 17, 1996).

* cited by examiner

*Primary Examiner* — Joseph Haley
*Assistant Examiner* — Emily Frank
(74) *Attorney, Agent, or Firm* — McClure, Qualey & Rodack, LLP (57) ABSTRACT

The invention provides an optical disk drive. In one embodiment, the optical disk drive comprises a feeding device, a power driver, and a controller. The feeding device comprises a spherical aberration (SA) lens and a stepping motor, wherein the SA lens corrects spherical aberration of a light beam emitted by a pickup head, and the stepping motor moves the SA lens according to a plurality of control signals. The power driver generates the control signals to drive the stepping motor to move the SA lens. The controller directs the power driver to drive the stepping motor to move the SA lens with only stable steps when the SA lens is required to move, so that the stepping motor is in a stable state without inducing step errors after the stepping motor rotates with the stable steps.

16 Claims, 8 Drawing Sheets

| Control signal | Motor excitation pattern | | | | | |
|---|---|---|---|---|---|---|
| +A | H | H | L | L | | |
| -A | L | L | H | H | | |
| +B | H | L | L | H | | |
| -B | L | H | H | L | | |
| No excitation of detainee | Stability | Instability | Stability | Instability | | |
| CW | | | | → | | |
| CCW | ← | | | | | |

FIG. 1 ( PRIOR ART )

| No. | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| | Initiating excitation | 1PS | 2PS | 3PS | 4PS | 5PS | Excitation extension | No excitation | Initiating excitation | 1PS | 2PS | 3PS | 4PS | 5PS | Excitation extension |
| +A | H | H | L | L | H | H | H | - | H | H | L | L | H | H | H |
| +B | H | L | L | H | H | L | L | - | L | H | H | L | L | H | H |

CW ← → CCW

OPTICAL DISK DRIVE AND METHOD FOR DRIVING A FEEDING DEVICE OF AN OPTICAL DISK DRIVE

BACKGROUND OF THE INVENTION

1. Field of the Invention

The invention relates to optical disk drives, and more particularly to feeding devices of optical disk drives.

2. Description of the Related Art

When an optical disk drive reads data from an optical disk with a high data density such as a blu-ray disk or a HD-DVD, a wavelength of a laserbeam emitted by a pickup head of the optical disk drive for reading data from the optical disk is reduced, and a numerical aperture of an objective lens for focusing the laserbeam on the optical disk is also increased. Increase of the numerical aperture increases probability of occurrence of spherical aberration which reduces precision of the signal reflected from a disk surface and increases error rate of data decoding. The optical disk drive therefore must comprise a mechanism for compensating for spherical aberration when the optical disk with a high data density is read.

A conventional mechanism for spherical aberration correction is a feeding device. A feeding device ordinarily comprises a spherical aberration (SA) lens and a stepping motor. The SA lens is positioned in a projecting path of the laserbeam to correct the spherical aberration. The stepping motor moves the SA lens to adjust a distance between an objective lens and the SA lens, thus allowing the SA lens to be put in an optimal position for precisely correcting the spherical aberration. Thus, precision of controlling the feeding device determines performance of spherical aberration correction.

Figure 1:
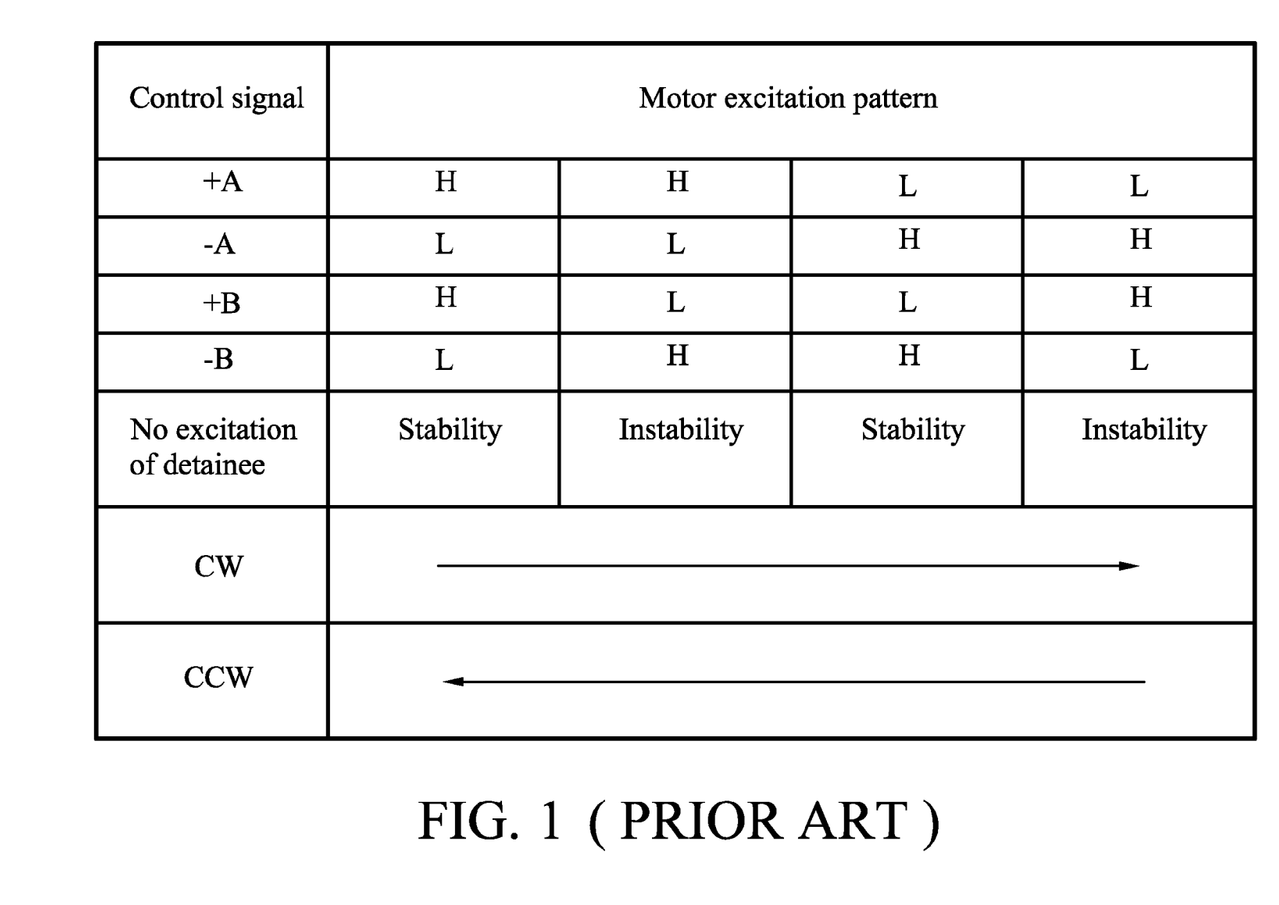
FIG. 1 shows a table of an excitation pattern of control signals for driving rotation of a stepping motor.

A stepping motor is ordinarily controlled by a plurality of control signals generated by a power driver. Referring to FIG. 1, a table of an excitation pattern of control signals for driving rotation of a stepping motor is shown. Four control signals +A, −A, +B, and −B are shown in the table. When the control signals (+A, +B) applied to a stepping motor are in the sequential excitation pattern of (H, H), (H, L), (L, L), and (L, H), the stepping motor rotates clockwise. When the control signals (+A, +B) applied to the stepping motor are in the sequential excitation pattern of (L, H), (L, L), (H, L), and (H, H), the stepping motor rotates counterclockwise. Each phase change of the control signals triggers the stepping motor to rotate by a predetermined angle.

When the control signals +A and +B are in the phases of (H, H) or (L, L), the stepping motor is in a stable state, which may mean surrounding electromagnets and a central rotation gear of the stepping motor are in complementary magnetic directions for some type of stepping motor. When the control signals +A and +B are in the phases of (H, L) or (L, H), the stepping motor is in an instable state, for example, in which surrounding electromagnets and a central rotation gear of the stepping motor are in opposite magnetic directions. The stepping motor therefore cannot be held at an instable state for a long period. Thus, when the control signals have an instable phase such as (H, L) or (L, H) at a last step of a driving excitation, the stepping motor automatically rotates by an extra angle to enter a stable state. The automatically rotated extra angle is referred to as "step errors". In addition, when the stepping motor is excited by the control signals for multiple times, the step errors accumulated with time become greater and greater, inducing inaccuracy in the position of the SA lens and requiring correction.

Figure 2:
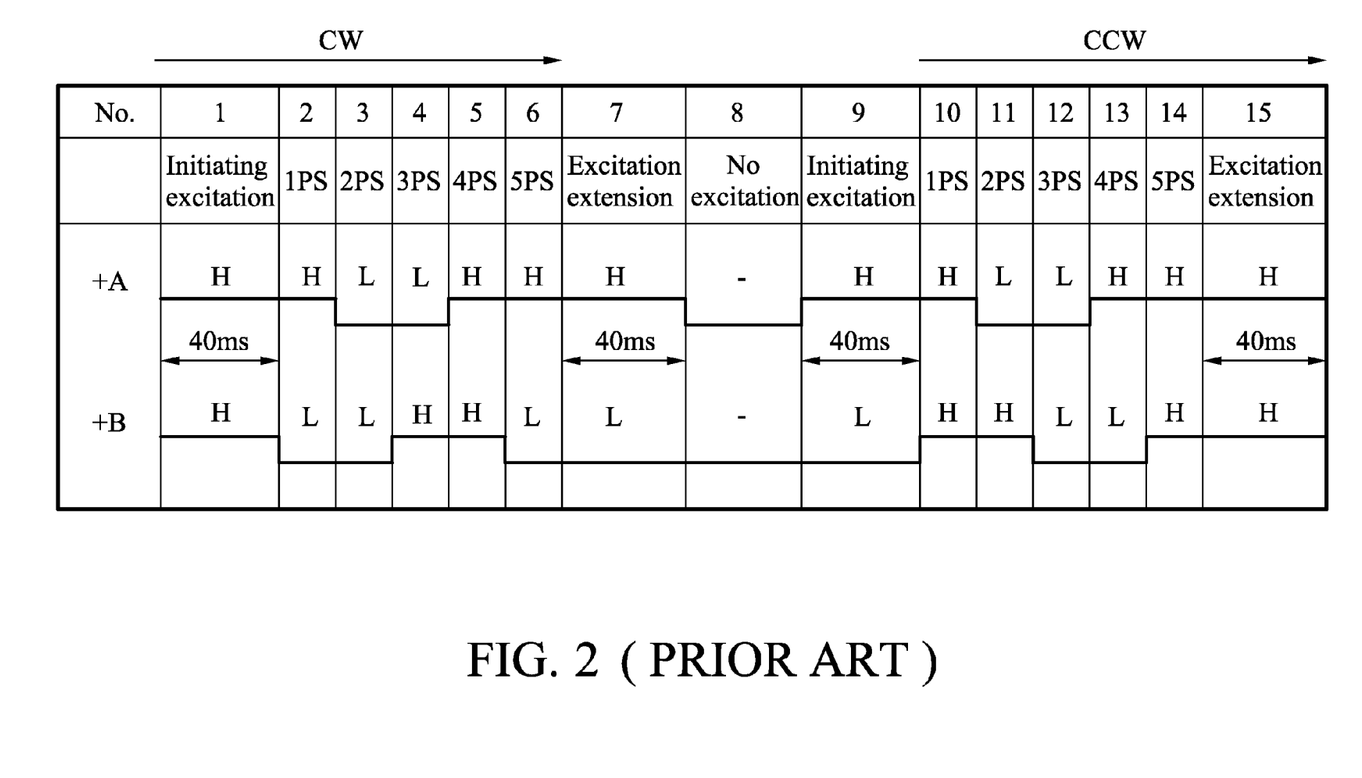
FIG. 2 is a schematic diagram of a conventional method for correcting step errors.

Referring to FIG. 2, a schematic diagram of a conventional method for correcting step errors is shown. Two driving excitations of the stepping motor are shown in FIG. 2. A first driving excitation comprises steps 1~7 to drive clockwise rotation of the stepping motor. A second driving excitation comprises steps 9~15 to drive counterclockwise rotation of the stepping motor. At a last step with a step number 7 of the first driving excitation, the control signals +A and +B have instable phases of (H, L) and step errors are therefore induced. To correct step errors, an initial excitation step with a step number 9 is added to the second driving excitation as a first step. The control signals +A and +B at the initial excitation step have the same phases (H, L) as that of the control signals at the latest step with the step number 7 in the prior driving excitation. Thus, step error is corrected, and the location of the SA lens is precisely controlled without being degraded due to step error accumulation.

The conventional method for step error correction, however, still has defects. Every time before a stepping motor is rotated, an initial excitation with a period of 40 ms is required for step error correction. Rotation of the stepping motor and motion of the SA lens are therefore delayed. When the SA lens is frequently required to move for spherical aberration correction, motion of the SA lens is frequently delayed, inducing delay in reading operation of the whole system and degrading system performance. Thus, a method for driving a feeding device of an optical disk drive without delays induced by initial excitation for step error correction is required.

BRIEF SUMMARY OF THE INVENTION

The invention provides an optical disk drive. In one embodiment, the optical disk drive comprises a feeding device, a power driver, and a controller. The feeding device comprises a spherical aberration (SA) lens and a stepping motor, wherein the SA lens corrects spherical aberration of a light beam emitted by a pickup head, and the stepping motor moves the SA lens according to a plurality of control signals. The power driver generates the control signals to drive the stepping motor to move the SA lens. The controller directs the power driver to drive the stepping motor to move the SA lens with only stable steps when the SA lens is required to move, so that the stepping motor is in a stable state without inducing step errors after the stepping motor rotates with the stable steps.

The invention also provides a method for driving a feeding device of an optical disk drive. In one embodiment, the feeding device comprises a spherical aberration (SA) lens and a stepping motor, the SA lens corrects spherical aberration of a light beam emitted by a pickup head, and the stepping motor moves the SA lens according to a plurality of control signals generated by a power driver. The stepping motor is driven to move the SA lens with only stable steps when the SA lens is required to move, so that the stepping motor is in a stable state without inducing step errors after the stepping motor rotates with the stable steps.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 3:
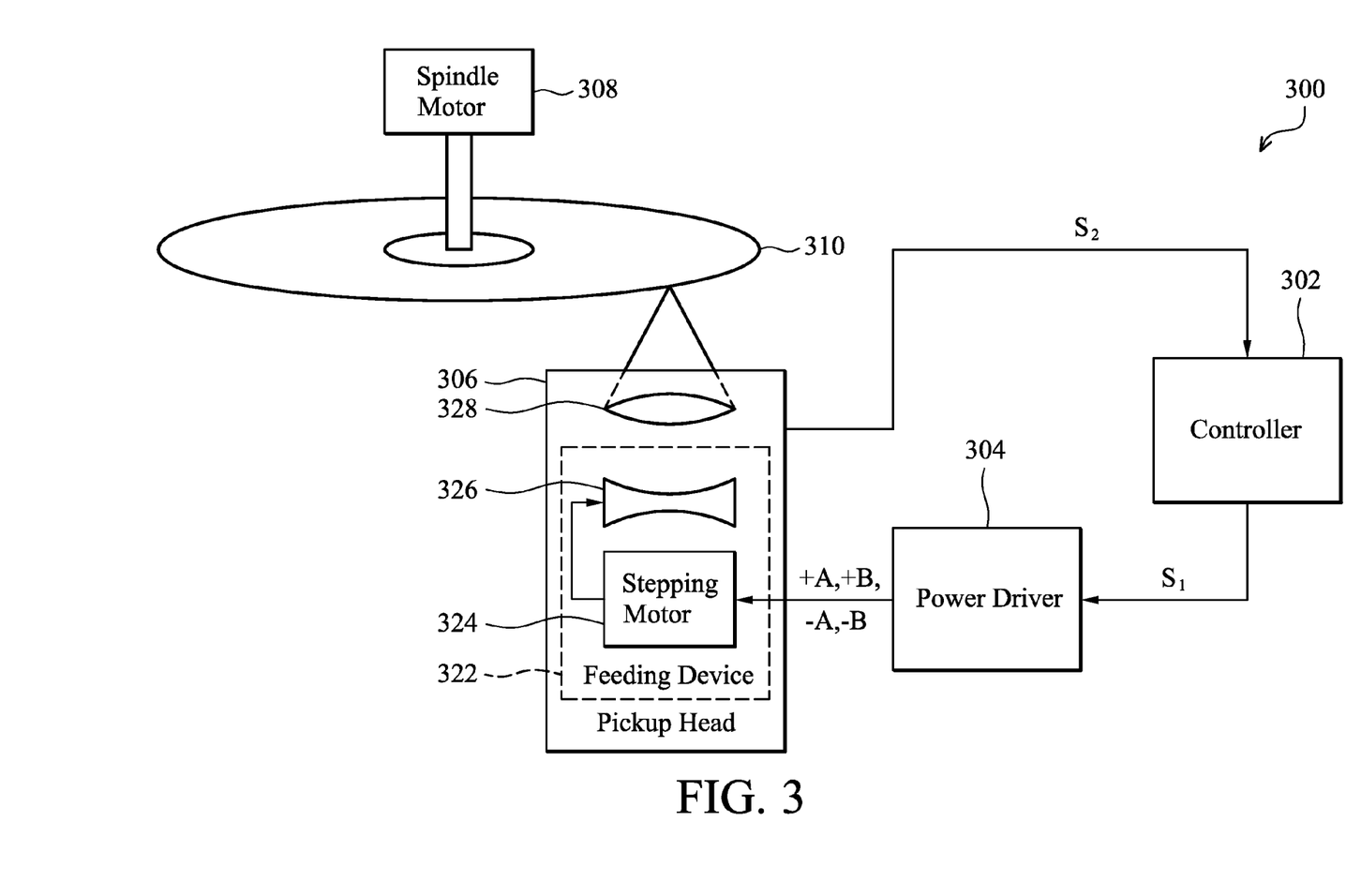
FIG. 3 is a block diagram of an optical disk drive driving a feeding device thereof according to the invention.

Referring to FIG. 3, a block diagram of an optical disk drive 300 driving a feeding device 322 thereof according to the invention is shown. The optical disk drive 300 comprises a controller 302, a power driver 304, a pickup head 306, and a spindle motor 308. The pickup head 306 comprises an objective lens 328 and a feeding device 322. After an optical disk 310 is loaded into the optical disk drive 300, the spindle motor 308 first rotates the optical disk 310. To read data from the optical disk 310, the pickup head 306 projects a laserbeam to the optical disk 310. The objective lens 328 of the pickup head 306 then focuses the laserbeam on the surface of the optical disk 310, inducing a reflection beam from the disk surface. The pickup head 306 then detects the reflection beam to obtain a reflection signal $S_2$ delivered to the controller 302. The controller 302 then decodes the reflection signal $S_2$ to obtain data recorded on the surface of the optical disk 310.

To allow the objective lens 328 to precisely focus the laserbeam on the surface of the optical disk 310, spherical aberration of the laserbeam should be corrected. The controller 302 may then send a signal $S_1$ to direct the power driver 304 to generate control signals, such as +A, +B, −A, and −B. The feeding device 322 of the pickup head 306 then may operate according to the control signals, such as +A, +B, −A, and −B, to correct spherical aberration, wherein control signals −A and −B may respectively have phases inverse to that of the control signals +A and +B. The feeding device 322 comprises a stepping motor 324 and a spherical aberration (SA) lens 326. Phase patterns of the control signals, such as +A, +B, −A, and −B, determine a rotation direction (clockwise or counterclockwise) and a rotation angle of the stepping motor 324. Consequently, the stepping motor 324 moves the SA lens 326 according to the control signals, such as +A, +B, −A, and −B, thus adjusting the position of the SA lens 326 to an optimal position for spherical aberration correction.

To avoid delays due to initial excitation for step error correction as the example of a conventional method shown in FIG. 2, the controller 302 directs the stepping motor 324 to always move the SA lens 326 with stable steps, so that after the stepping motor 324 rotates according to the stable steps, the stepping motor 324 is in a stable state without inducing step errors. In other words, the controller 302 always directs the power driver 304 to generate control signals, such as +A, +B, −A, and −B, to drive the stepping motor 324 with stable steps, so that the phases of the control signals +A and +B at a last step of the stable steps are in a stable phase, such as (H, H) or (L, L) in the embodiment of FIG. 1. Because the controller 302 always directs the stepping motor 324 to move the SA lens 328 with stable steps, the stepping motor 324 is always in a stable state after each driving excitation is performed. In other words, for example, surrounding electromagnets and a central rotation gear of the stepping motor 324 may always be in complementary magnetic directions without further automatic rotation after each driving excitation is performed, and no step errors are induced in each driving excitation. Thus, no correction of step errors is required, and the optical disk drive 300 can smoothly adjust the position of the SA lens 326 without delays due to step error correction in a reading process, improving performance of the optical disk drive 300.

Figure 4:
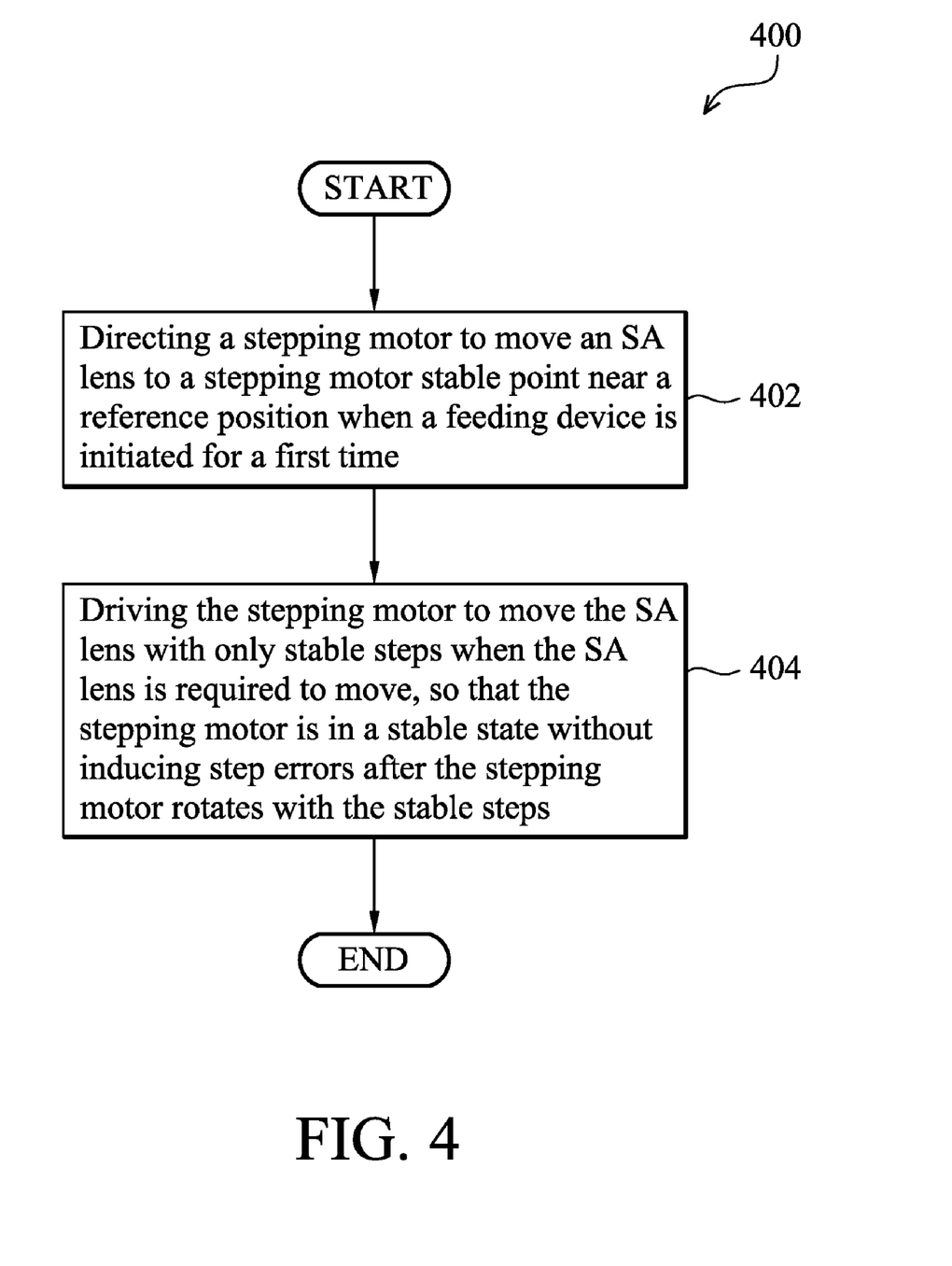
FIG. 4 is a flowchart of a method for driving a feeding device of an optical disk drive according to the invention.

Referring to FIG. 4, a flowchart of a method 400 for driving a feeding device 322 of an optical disk drive 300 according to the invention is shown. For convenience in calibrating positions of the SA lens 326, an ordinary feeding device 322 may comprise a home sensor detecting whether the SA lens 326 is moved to a reference position which is taken as an origin for counting a moving distance of the SA lens 326. The optical disk drive 300 takes a reference position as an origin for moving the SA lens 326 and measures a moved position of the SA lens 326 relative to the reference position. When the optical disk drive 300 comprises a home sensor, the home sensor detects whether the SA lens 326 is moved to a reference position as auxiliary information for calibrating the position of the SA lens 326. When the optical disk drive 300 does not comprise a home sensor, the power driver 304 may move the SA lens 326 to a position with a greatest movable distance where the SA lens 326 cannot be moved any farther. Because the position with the greatest movable distance may be the reference position or at an offset distance from the reference position, the optical disk drive 300 can therefore determine the reference position according to the position with the greatest movable distance. The optical disk drive 300 therefore can determine the reference position no matter whether it comprises a home sensor or not. Thus, the present invention applies whether the optical disk drive has home sensor or not.

When a feeding device is initiated for a first time, a conventional controller ordinarily moves an SA lens back to a reference position for calibration. When a feeding device 322 of the invention is initiated for a first time, instead of moving the SA lens 326 directly to a reference position as the conventional controller, the controller 302 of the invention directs the stepping motor 324 to move the SA lens 326 to a stepping motor stable point near a reference position (step 402), wherein the stepping motor is in a stable state without inducing step errors when the stepping motor moves the SA lens 326 to the stepping motor stable point.

Figure 5A:
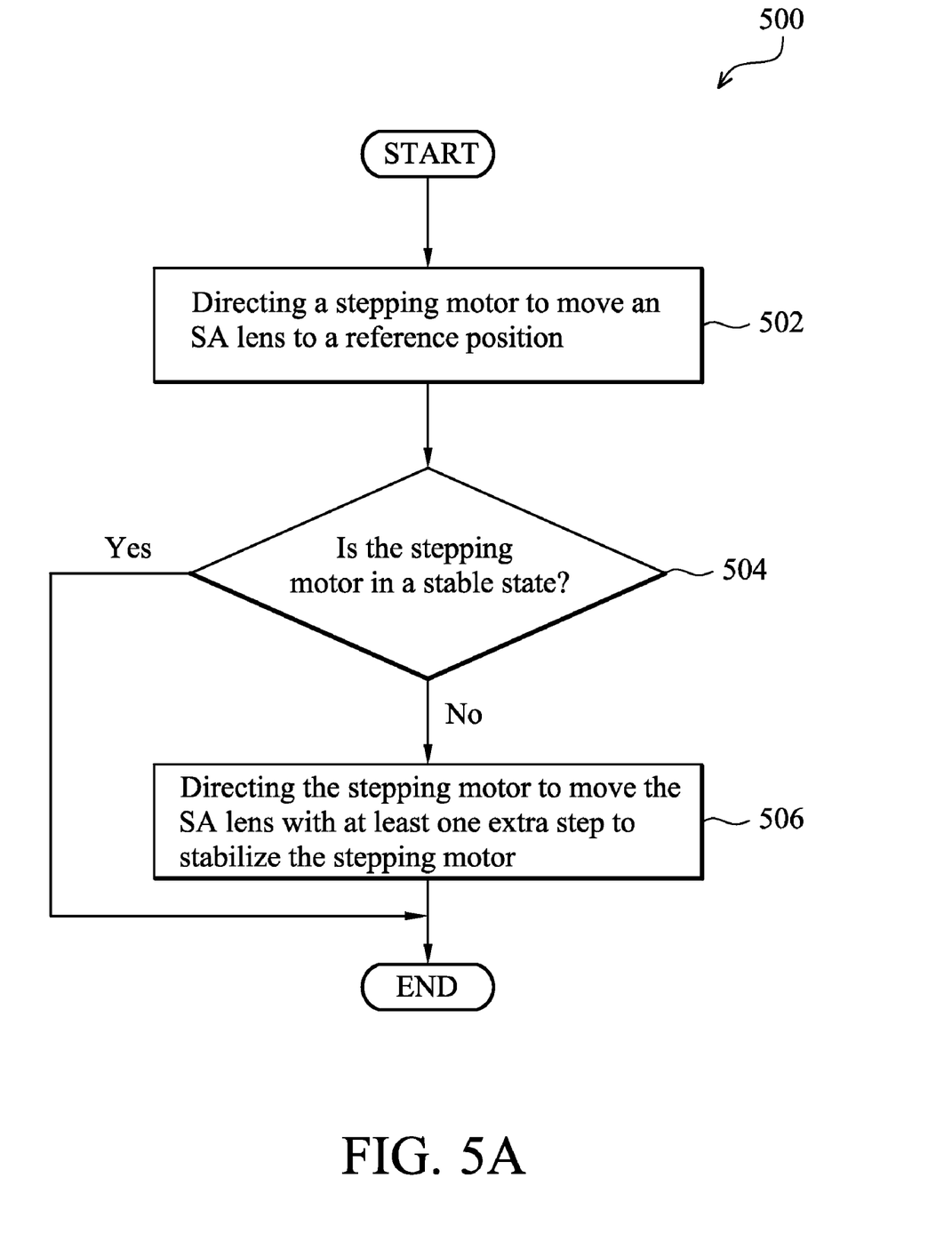
FIG. 5A is a flowchart of a method for moving an SA lens to a stepping motor stable point according to the invention.

To explain the details of step 402, two embodiments of moving the SA lens 326 to a stepping motor stable point are disclosed in the following. Referring to FIG. 5A, a flowchart of a method 500 for moving an SA lens 326 to a stepping motor stable point according to the invention is shown. The controller 302 first drives the stepping motor 324 to move the SA lens 326 to the reference position (step 502). When the SA lens 326 reaches the reference position, the controller 302 determines whether the stepping motor 324 is in a stable state (step 504). In one embodiment, the controller 302 determines whether the stepping motor 324 is in a stable state by checking phases of the control signals, such as +A, +B, −A, and −B, generated by the power driver 304. For example, when the phases of the control signals +A and +B are (H, H) or (L, L), the stepping motor 324 is in the stable state according to the table in FIG. 1. When the stepping motor 324 is not in a stable state, the controller 302 directs the stepping motor 324 to move the SA lens 326 with at least one extra step to stabilize the stepping motor (step 506), and the phases of the control signals, such as +A and +B, are thereby changed to, for example, (H, H) or (L, L). In other words, the SA lens 326 is moved to a stepping motor stable point other than the reference position if the stepping motor 324 is not at a stable state when the SA lens 326 reaches the reference position. Thus, the stepping motor 324 is in the stable state when the SA lens 326 is at the stepping motor table point.

Figure 5B:
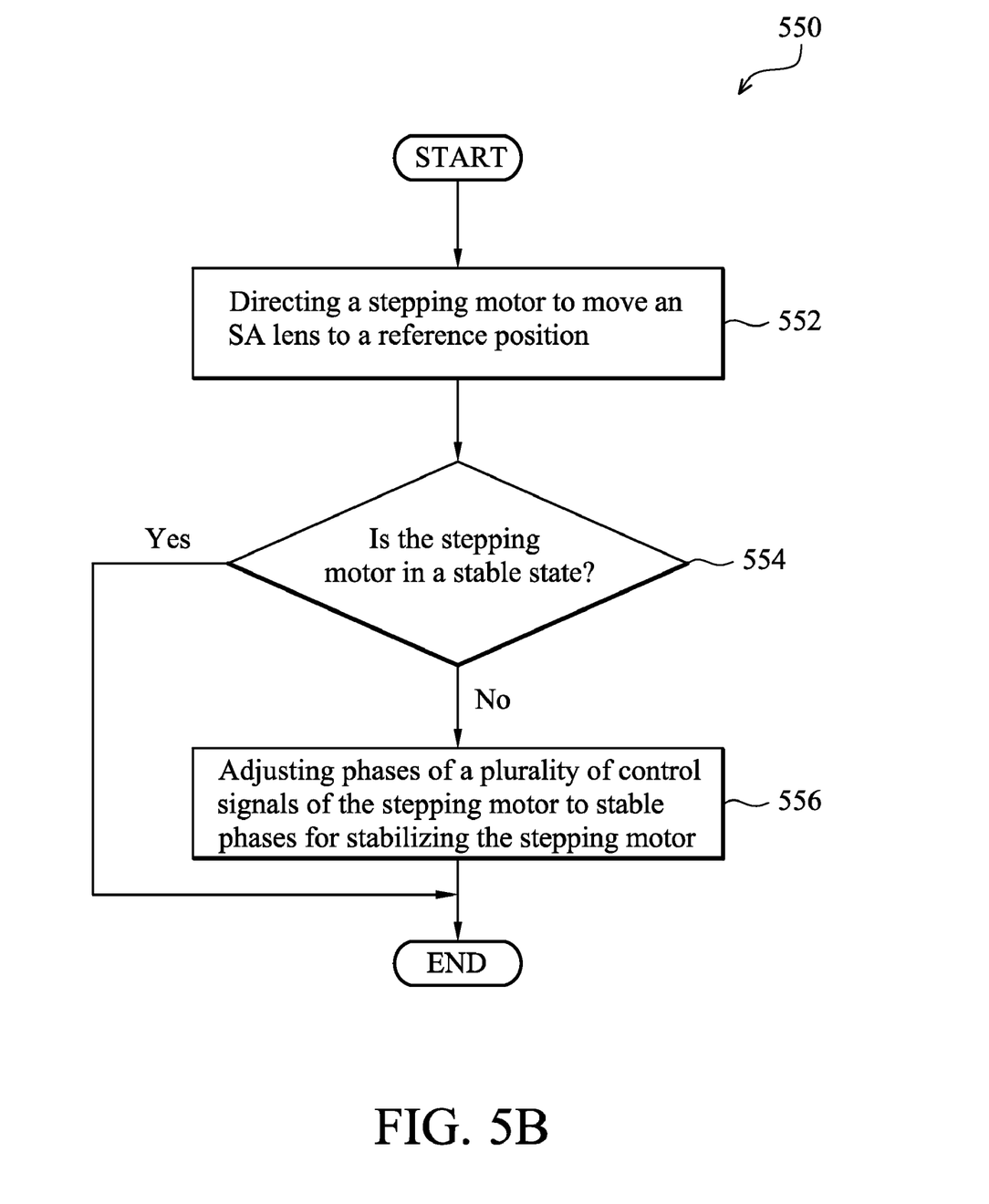
FIG. 5B is a flowchart of a method for moving an SA lens to a stepping motor stable point according to the invention.

Referring to FIG. 5B, a flowchart of a method 550 for moving an SA lens 326 to a stepping motor stable point according to the invention is shown. The controller 302 first drives the stepping motor 324 to move the SA lens 326 to the reference position (step 552). When the SA lens 326 reaches the reference position, the controller 302 determines whether the stepping motor 324 is in a stable state (step 554). In one embodiment, the controller 302 determines whether the stepping motor 324 is in a stable state by checking phases of the control signals, such as +A, +B, −A, and −B, generated by the power driver 304. For example, when the phases of the control signals +A and +B are (H, H) or (L, L), the stepping motor 324 is in the stable state according to the table in FIG. 1. When the stepping motor 324 is not in a stable state, the controller 302 directly adjusts phases of the control signals, such as +A, +B, −A, and −B, to stable phases, for example, (H, H, L, L) or (L, L, H, H) (step 556), thus stabilizing the stepping motor. Consequently, the stepping motor 324 is in the stable state when the SA lens 326 is at the stepping motor table point.

Please refer back to FIG. 4. The stepping motor 324 is therefore in a stable state after the feeding device 322 is initiated for a first time, and no step error is induced at step 402. The SA lens 326 may then be required to move for spherical aberration correction. Whenever the SA lens 326 is required to move, the controller 302 directs the power driver 304 to drive the stepping motor 324 to move the SA lens 326 with only stable steps (step 404), so that the stepping motor 324 is in a stable state without inducing step errors after the stepping motor rotates with the stable steps. In other words, the control signals, such as +A and +B, are always in a stable phase such as (H, H) or (L, L) after each driving excitation is performed. In one embodiment, the controller 302 always directs the stepping motor 324 to move the SA lens 326 with an even number of steps in each driving excitation, such as 2, 4, 6, or 8 steps. Referring to FIG. 1, because the control signals, such as +A and +B, have stable phases, for example, (H, H) or (L, L) at a last step of a prior driving excitation, when a subsequent driving excitation driving the stepping motor 324 comprises an even number of steps, the control signals +A and +B may also have stable phases (H, H) or (L, L) at a last step of the subsequent driving excitation. The stepping motor 324 is therefore kept at a stable state after the SA lens 326 is moved, and no step error is induced. The feeding device 322 of the optical disk drive 300 therefore requires no step error correction. Thus, no delay time is induced by step error correction, improving performance of the optical disk drive 300.

Figure 6:
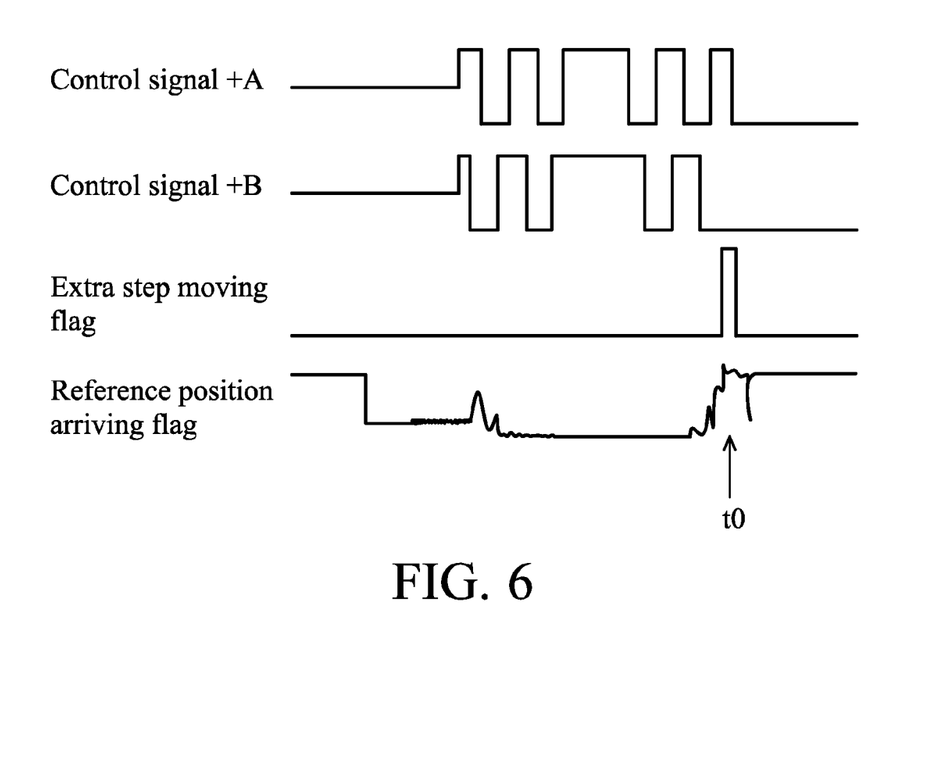
FIG. 6 shows an example of signals corresponding to the method of FIG. 5A.

Referring to FIG. 6, a schematic diagram of illustrative signals corresponding to the method 500 of FIG. 5A is shown. The power driver 304 first generates the control signals, such as +A and +B, to direct the stepping motor 324 to move the SA lens 326 to a reference position. A home sensor may then detect whether the SA lens 326 has reached the reference position. If so, a reference position arriving flag is enabled. Please note that the present invention applies whether the optical disk drive has home sensor or not. When the SA lens reaches the reference position at time t0, the reference position arriving flag is enabled, but the control signals, such as +A and +B, have instable phases of, for example, (H, L). The controller 302 therefore directs the stepping motor 324 to move the SA lens 326 for an extra step to change the phases of the control signals, such as +A and +B, to, for example, (L, L), thus making the stepping motor 324 to enter a stable state.

Figure 7:
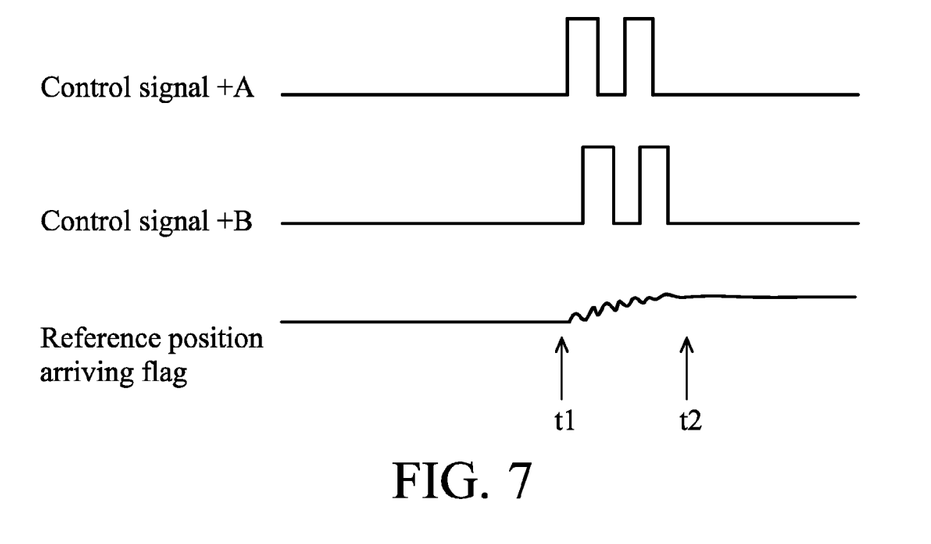
FIG. 7 shows an example of signals corresponding to the step 404 of FIG. 4.

Referring to FIG. 7, a schematic diagram of signals corresponding to the step 404 of FIG. 4 is shown. At time t1 prior to a driving excitation of the stepping motor 324, the control signals, such as +A and +B, have stable phases of, for example, (L, L). A driving excitation, which may comprise eight steps, is then applied to the stepping motor 324 to move the SA lens 326 to a reference position, and the reference arriving flag is enabled at time t2. Because the driving excitation comprises an even number of steps, the control signals have stable phases of, for example, (L, L) when the driving excitation ends at time t2. Thus, no step errors are induced after the SA lens 326 is moved to the reference position.

Figure 8:
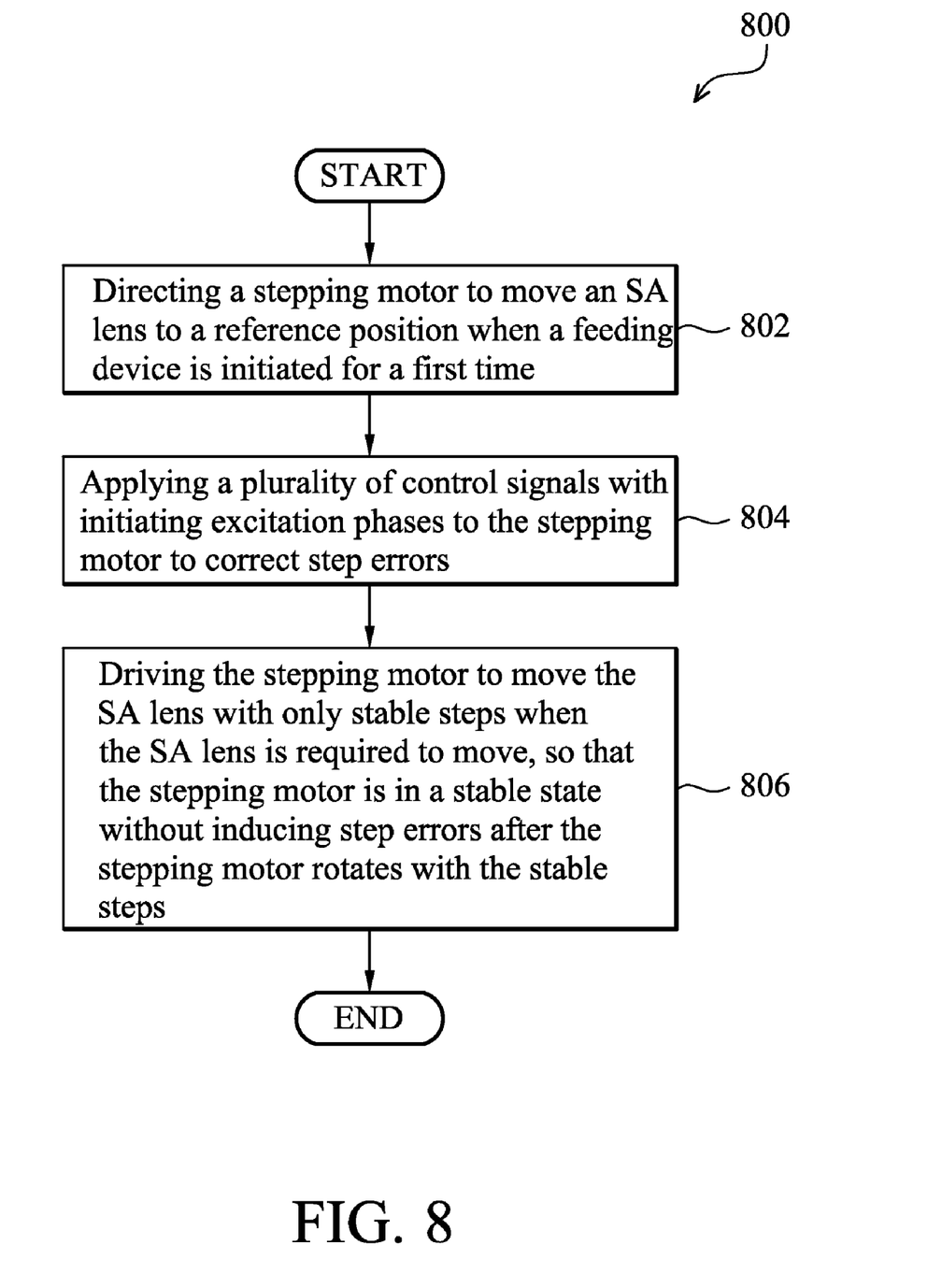
FIG. 8 is a flowchart of another embodiment of a method for driving a feeding device of an optical disk drive according to the invention.

Referring to FIG. 8, a flowchart of another embodiment of a method 800 for driving a feeding device 322 of an optical disk drive 300 according to the invention is shown. When the feeding device 322 is initiated for a first time, the controller 302 drives the stepping motor 324 to move the SA lens 326 to a reference position (step 802). When the stepping motor 324 reaches the reference position, the stepping motor 324 therefore may be in a stable state or in an instable state. If the stepping motor 324 is in an instable state inducing step errors, before a next driving excitation is applied to the stepping motor 324, control signals with phases of an initial excitation pattern are applied to the stepping motor 324 to correct step errors induced in step 802 (step 804). The initial excitation patterns may be the same as the phases of the control signals at a last step of a prior driving of the stepping motor 324, as the example shown in FIG. 2. The controller 302 then always drives the stepping motor 324 to move the SA lens 326 with stable steps when the SA lens 326 is required to move, so that the stepping motor is in a stable state without inducing step errors (step 806). Thus, no step errors are induced, and the optical disk drive 300 requires no step error correction.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An optical disk drive, comprising:
   a feeding device, comprising a spherical aberration (SA) lens and a stepping motor, wherein the SA lens is capable of correcting spherical aberration of a light beam emitted by a pickup head, and the stepping motor is capable of moving the SA lens according to a plurality of control signals;
   a power driver, coupled to the feeding device, capable of generating the control signals to drive the stepping motor to move the SA lens; and
   a controller, coupled to the power driver, capable of driving the stepping motor with only stable steps through the power driver during a driving excitation;
   wherein the stepping motor does not substantially rotate when there is no driving excitation;
   wherein when the feeding device is initiated for a first time, the controller directs the stepping motor to move the SA lens to a stepping motor stable point near a reference position, wherein the stepping motor is in the stable state without inducing step errors when the stepping motor moves the SA lens to the stepping motor stable point.

2. The optical disk drive as claimed in claim 1, wherein the stable steps comprise an even number of steps.

3. The optical disk drive as claimed in claim 1, wherein the controller first drives the stepping motor to move the SA lens to the reference position, then determines whether the stepping motor is in the stable state, and then directs the stepping motor to move the SA lens with at least one extra step to stabilize the stepping motor when the stepping motor is not in the stable state, thus directing the stepping motor to move the SA lens to the stepping motor stable point.

4. The optical disk drive as claimed in claim 1, wherein the controller first drives the stepping motor to move the SA lens to the reference position, then determines whether the stepping motor is in the stable state, and then adjusts phases of the control signals to stable phases for stabilizing the stepping motor when the stepping motor is not in the stable state, thus directing the stepping motor to move the SA lens to the stepping motor stable point.

5. The optical disk drive as claimed in claim 1, wherein the controller determines whether the stepping motor is in the stable state by checking phases of the control signals generated by the power driver.

6. The optical disk drive as claimed in claim 1, wherein when the SA lens is required to move for a first time and the stepping motor has step errors generated during initiation, the controller directs the power driver to generate the control signals with phases of initial excitation patterns for step error correction before moving the SA lens.

7. The optical disk drive as claimed in claim 6, wherein the initial excitation patterns are the same as the phases of the control signals at a last step of a prior driving of the stepping motor.

8. The optical disk drive as claimed in claim 1, wherein the optical disk drive does not comprise a home sensor, and the controller directs the feeding device to move the SA lens until the SA lens is moved to a position with a greatest movable distance where the SA lens cannot be moved any farther, and then determines the reference position according to the position with the greatest movable distance.

9. A method for driving a feeding device of an optical disk drive, wherein the feeding device comprises a spherical aberration (SA) lens and a stepping motor, the SA lens corrects spherical aberration of a light beam emitted by a pickup head, and the stepping motor moves the SA lens according to a plurality of control signals generated by a power driver, comprising:
when the feeding device is initiated for a first time, directing the stepping motor to move the SA lens to a stepping motor stable point near a reference position, wherein the stepping motor is in the stable state without inducing step errors when the stepping motor moves the SA lens to the stepping motor stable point; and
driving the stepping motor with only stable steps during a driving excitation to move the SA lens;
wherein the stepping motor does not substantially rotate when there is no driving excitation.

10. The method as claimed in claim 9, wherein the stable steps comprise an even number of steps.

11. The method as claimed in claim 9, wherein directing the stepping motor to move the SA lens to the stepping motor stable point comprises:
driving the stepping motor to move the SA lens to the reference position;
determining whether the stepping motor is in the stable state;
when the stepping motor is not in the stable state, directing the stepping motor to move the SA lens with at least one extra step to stabilize the stepping motor.

12. The method as claimed in claim 9, wherein directing the stepping motor to move the SA lens to the stepping motor stable point comprises:
driving the stepping motor to move the SA lens to the reference position;
determining whether the stepping motor is in the stable state; and
when the stepping motor is not in the stable state, adjusting phases of the control signals to stable phases for stabilizing the stepping motor.

13. The method as claimed in claim 9, wherein the method further comprises checking phases of the control signals generated by the power driver to determine whether the stepping motor is in the stable state.

14. The method as claimed in claim 9, wherein the method further comprises when the SA lens is required to move for a first time and the stepping motor has step errors generated during initiation, directing the power driver to generate the control signals with phases of initial excitation patterns for step error correction before moving the SA lens.

15. The method as claimed in claim 14, wherein the initial excitation patterns are the same as the phases of the control signals at a last step of a prior driving of the stepping motor.

16. The method as claimed in claim 9, wherein the optical disk drive does not comprise a home sensor, and the method further comprises directing the feeding device to move the SA lens until the SA lens is moved to a position with a greatest movable distance where the SA lens cannot be moved any farther, and determining the reference position according to the position with the greatest movable distance.

* * * * *